J. N. MOULTON.
WELT STRIP.
APPLICATION FILED OCT. 8, 1918.
1,308,804.
Patented July 8, 1919.
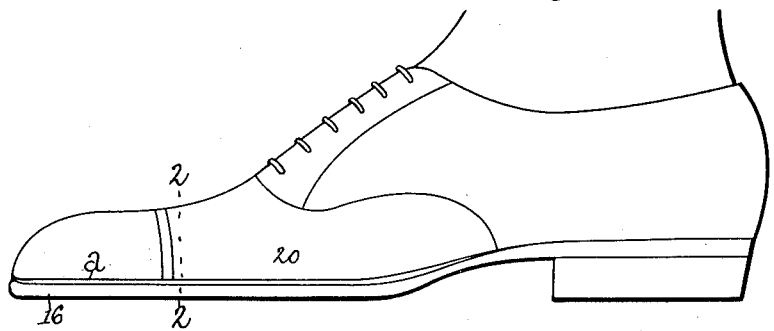
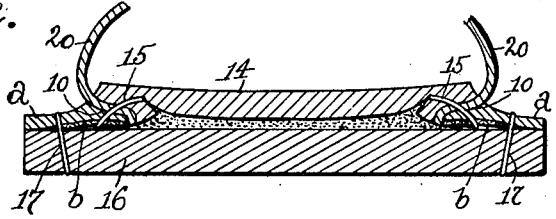
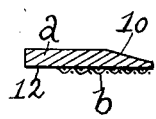
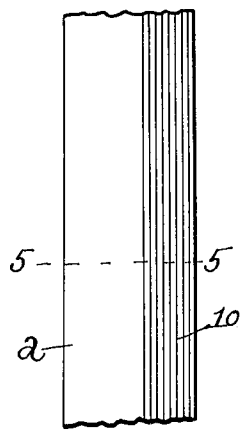
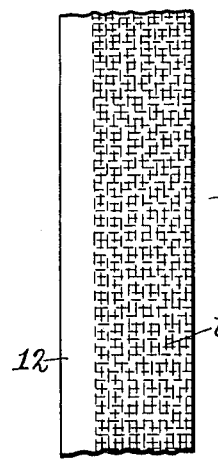
Inventor:
James N. Moulton
by Jas. H. Churchill
atty.

UNITED STATES PATENT OFFICE.

JAMES N. MOULTON, OF HAVERHILL, MASSACHUSETTS.

WELT-STRIP.

1,308,804.  Specification of Letters Patent.  Patented July 8, 1919.

Application filed October 8, 1918. Serial No. 257,397.

*To all whom it may concern:*

Be it known that I, JAMES N. MOULTON, a citizen of the United States, residing in Haverhill, in the county of Essex and State of Massachusetts, have invented an Improvement in Welt-Strips, of which the following description, in connection with the accompanying drawings, is a specification, like characters on the drawings representing like parts.

This invention relates to a composite welt strip for boots and shoes, and has for its object to provide a superior and inexpensive welt for the purpose specified.

To this end the composite welt strip comprises a strip or layer of rubber of substantial thickness having adhesively affixed to its under surface only a layer or strip of cloth or other fabric which is narrower than the rubber strip or layer and extends from the inner edge toward but not to the outer edge of the rubber strip so as to leave a portion of the rubber strip on its under side uncovered by the cloth strip, and thereby provide the welt strip with an outside portion of rubber which is not reinforced by fabric.

The cloth strip or layer reinforces the rubber strip and prevents the latter being cut by the stitches which secure the welt to the insole and by the stitches which secure the outsole to the welt, both of which stitches are designed to pass through the reinforcing cloth or fabric strip as well as the rubber strip. The rubber strip is reduced in thickness at its inner side, which may be accomplished by providing the upper surface with a beveled portion, which beveled portion is of material width to provide the welt strip with a relatively thin inner side which increases the flexibility of the reinforced inner side and enables a closer seam to be made when sewed to the insole, and by making the cloth strip narrower than the rubber strip so as to leave a portion of the undersurface of the rubber strip uncovered, a welt strip is obtained, which is reinforced at its reduced inner side and not reinforced at its outer side, with the result that the welt strip is of increased flexibility at its outer side which enables the reinforced welt strip to be stretched as it is laid around the toe of the shoe and to be easily and quickly laid around the toe without wrinkles, and further a more finished appearance is imparted to the boot or shoe as the fabric does not show on the edge of the shoe, for the rubber strip is enabled to be brought directly in contact with the outer sole so as to conceal the cloth or fabric layer, and also form a water-tight joint with the outer sole, and by reducing the thickness of the rubber layer at its inner side for a material width, the stiffness which would otherwise be added to the rubber layer by the reinforcing fabric, is counteracted by the increase in flexibility of the inner side of the rubber layer, which is thus rendered so flexible as to enable it to make the closer seam above referred to.

These and other features of this invention will be pointed out in the claims at the end of this specification.

Figure 1 is a side elevation of a shoe provided with a welt embodying this invention.

Fig. 2, a cross section of the shoe shown in Fig. 1 on the line 2—2.

Fig. 3, a plan on an enlarged scale of the welt strip shown in Figs. 1 and 2.

Fig. 4, an inverted plan of said welt strip to show the fabric layer, and

Fig. 5, a cross section on the line 5—5, Fig. 3.

Referring to the drawing and especially Figs. 3 to 5, *a* represents a relatively narrow strip or layer of rubber of substantial thickness, and *b* a narrower strip or layer of cloth or other fabric which is adhesively affixed to the underside of the rubber layer or strip *a*.

The rubber strip *a* is reduced in thickness on its inner side preferably by providing its upper surface with a beveled portion 10, which is of material width and which may be effected by a suitable skiving machine. The beveled portion 10 extends to the inner edge of the rubber strip and provides the latter with a thin inner edge, and the cloth strip or layer *b* is affixed to the under surface only of the rubber strip at or near its inner edge and extends toward but not to the outer edge thereof, so that a portion 12 of the under surface of the rubber strip is left uncovered. The cloth strip *b* may be made initially narrower than the rubber strip or as is preferred, a substantially wide sheet of cloth may be applied to a sheet of rubber, and adhesively affixed thereto by passing then through heated rolls in a manner well understood, after which the composite sheet thus found is cut up into narrow strips and these narrow strips are cut on their upper surface to form the beveled portion 10 and on their under surface to remove a portion of the fabric strip, and when the latter is thus removed, the rubber strip is uncovered near its outer edge for the portion 12 of its under surface.

The composite strip thus formed is then applied to the shoe and sewed thereto in the same manner as the ordinary leather welt, being secured to the insole 14 by the inseam stitches 15 and to the outsole 16 by the fair stitches 17.

When the welt is incorporated in the shoe, the beveled portion 10 of the rubber layer $a$ is presented to the upper 20 so as to make contact therewith and by reason of this beveled portion being of material width, the thickness of the welt is reduced at its inner side or edge and enables a close seam to be formed with the insole.

The inseam stitches 15 extend through the reinforcing cloth layer $b$ as do also the fair sections 17 and said reinforcing layer or strip prevents the stitches cutting or breaking through the rubber layer. The uncovered portion 12 of the under surface of the rubber layer makes contact with the out sole 16 and forms a water tight joint therewith, and conceals the fabric layer $b$ from view, thereby adding materially to the finish and appearance of the shoe. Furthermore the outer edge portion of the rubber strip being uncovered on its under surface as well as on its upper surface, increases the flexibility of the welt strip and enables the rubber to stretch naturally as it is laid about the toe of the shoe, which enables this work to be performed quickly and easily and without forming wrinkles.

By the term "rubber" I desire to include not only rubber but also the so-called rubber compounds.

Claims:

1. A composite welt strip for boots and shoes, comprising a layer of rubber having its upper surface in its normal condition and provided with a beveled portion of material width near its inner edge to render the rubber layer of increased flexibility at its inner side, and a layer of fabric adhesively affixed to the under surface of the rubber layer and extended from near the inner edge thereof toward but not to the outer edge thereof to leave a portion of said under surface uncovered at the outer edge of the composite strip.

2. A composite welt strip for boots and shoes, comprising a layer of rubber having its upper surface in its normal condition and one side of less thickness than the opposite side for a material width of the rubber layer, and a layer of fabric adhesively affixed to the under surface of the rubber layer and extended toward but not to the outer edge thereof to leave a portion of said under surface uncovered at the outer edge of said composite surface.

In testimony whereof I have signed my name to this specification.

JAMES N. MOULTON.